(12) United States Patent
Shi et al.

(10) Patent No.: US 10,267,485 B2
(45) Date of Patent: Apr. 23, 2019

(54) LIGHTING MODULE AND LIGHTING LAMP

(71) Applicant: OPPLE LIGHTING CO., LTD., Shanghai (CN)

(72) Inventors: Xiufeng Shi, Shanghai (CN); Jianguo Li, Shanghai (CN); Aiqin Huang, Shanghai (CN)

(73) Assignee: OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 15/677,624

(22) Filed: Aug. 15, 2017

(65) Prior Publication Data

US 2017/0343184 A1    Nov. 30, 2017

Related U.S. Application Data

(63) Continuation of application No. PCT/CN2016/080203, filed on Apr. 26, 2016.

(30) Foreign Application Priority Data

Apr. 30, 2015  (CN) .......................... 2015 1 0217720
Apr. 30, 2015  (CN) .......................... 2015 1 0218120
(Continued)

(51) Int. Cl.
*F21V 5/04*    (2006.01)
*G02B 3/08*    (2006.01)
(Continued)

(52) U.S. Cl.
CPC ................ *F21V 5/04* (2013.01); *F21S 8/026* (2013.01); *F21V 7/0091* (2013.01);
(Continued)

(58) Field of Classification Search
CPC ...................................................... F21S 8/026
See application file for complete search history.

(56) References Cited

U.S. PATENT DOCUMENTS

| | | | |
|---|---|---|---|
| 2008/0043466 A1* | 2/2008 | Chakmakjian | F21V 5/007 362/237 |
| 2012/0140442 A1* | 6/2012 | Woo | F21V 7/04 362/95 |

(Continued)

FOREIGN PATENT DOCUMENTS

| | | |
|---|---|---|
| CN | 202469550 U | 10/2012 |
| CN | 103353076 A | 10/2013 |

(Continued)

OTHER PUBLICATIONS

International Search Report (including English translation) issued in corresponding International Application No. PCT/CN2016/080203, dated Aug. 2, 2016, 8 pages.
(Continued)

*Primary Examiner* — Diane I Lee
*Assistant Examiner* — Keith G. Delahoussaye
(74) *Attorney, Agent, or Firm* — Arch & Lake LLP

(57) ABSTRACT

The present disclosure discloses a lighting module including a light source module, a driving module, and an optical element and a lighting lamp. The light source module includes a light source plate and a plurality of Light-Emitting Diode (LED) light sources. Emergent light of the LED light source is emitted after passing through the optical element, and the optical element has a light incident portion and a light emergent portion. The driving module and the LED light source are respectively adhered to the light source plate and are integrated on the light source plate, the light incident portion of the optical element covers above the light source plate, receives the emergent light of the LED light source and carries out optical configuration on the emergent (Continued)

light of the LED light source, and the driving module is arranged in a periphery of the light incident portion of the optical element.

11 Claims, 7 Drawing Sheets

(30) Foreign Application Priority Data

Apr. 30, 2015 (CN) .................. 2015 2 0276376 U
Apr. 30, 2015 (CN) .................. 2015 2 0276791 U

(51) Int. Cl.
| | | |
|---|---|---|
| F21V 29/74 | (2015.01) | |
| F21S 8/02 | (2006.01) | |
| F21V 7/00 | (2006.01) | |
| F21V 17/10 | (2006.01) | |
| F21V 23/00 | (2015.01) | |
| F21Y 115/10 | (2016.01) | |
| F21V 15/01 | (2006.01) | |
| F21V 19/00 | (2006.01) | |
| F21V 29/77 | (2015.01) | |
| F21Y 105/10 | (2016.01) | |

(52) U.S. Cl.
CPC .......... *F21V 17/101* (2013.01); *F21V 23/005* (2013.01); *F21V 29/74* (2015.01); *G02B 3/08* (2013.01); *F21V 15/01* (2013.01); *F21V 19/003* (2013.01); *F21V 29/773* (2015.01); *F21Y 2105/10* (2016.08); *F21Y 2115/10* (2016.08)

(56) References Cited

U.S. PATENT DOCUMENTS

2016/0061439 A1* 3/2016 Jurik .................. A63J 5/025
                                                        362/96
2017/0045188 A1* 2/2017 Im ..................... F21V 29/00

FOREIGN PATENT DOCUMENTS

| | | | |
|---|---|---|---|
| CN | 104373896 A | 2/2015 | |
| CN | 204141318 U | 2/2015 | |
| CN | 104832814 A | 8/2015 | |
| CN | 104832881 A | 8/2015 | |
| CN | 204678096 U | 9/2015 | |
| CN | 204678255 U | 9/2015 | |
| WO | WO-2015144990 A1 * | 10/2015 | ............... G02B 3/08 |

OTHER PUBLICATIONS

Written Opinion issued in corresponding International Application No. PCT/CN2016/080203, dated Aug. 2, 2016, 5 pages.

* cited by examiner

LIGHTING MODULE AND LIGHTING LAMP

CROSS-REFERENCE TO RELATED APPLICATIONS

This application is based upon and claims the priority of PCT patent application No. PCT/CN2016/080203 filed on Apr. 26, 2016 which claims the priority of Chinese Patent Application No. 201510217720.8 filed on Apr. 30, 2015, Chinese Patent Application No. 201520276376.5 filed on Apr. 30, 2015, Chinese Patent Application No. 201510218120.3 filed on Apr. 30, 2015, and Chinese Patent Application No. 201520276791.0 filed on Apr. 30, 2015, the entire contents of all of which are hereby incorporated by reference herein for all purposes.

TECHNICAL FIELD

Embodiments of the present disclosure relate to a lighting module and a lighting lamp.

BACKGROUND

Lighting is a measure of utilizing various light sources to light up working and living places or individual objects. Lighting which utilizes sunlight and skylight is called as "natural lighting"; and lighting which utilizes an artificial light source is called as "artificial lighting". Lighting firstly aims to create visibility and a comfortable and pleasant environment.

Lighting of interior design is the professional design carried out on illuminance, color temperatures, color rendering indexes and the like of various building environments. Lighting of interior design not only should meet requirements for interior "brightness", but also should create an effect of improving environments and atmospheres. Generally, an interior architect requests, and an electrical engineer carries out the work for creating the interior lighting. Meanwhile, lighting of interior design may also mean an action of lighting up by lamplight or a state of being lighted up by a lamp.

SUMMARY

The present disclosure provides a lighting module and a lighting lamp for the lighting design.

A lighting module is disclosed in the present disclosure. The lighting module may include a light source module, which may include a light source plate and a plurality of Light-Emitting Diode (LED) light sources; a driving module; and an optical element, where emergent light of the LED light source may be emitted after passing through the optical element, and the optical element may have a light incident portion and a light emergent portion; and where the driving module and the LED light source may be respectively adhered to the light source plate and may be integrated on the light source plate, the light incident portion of the optical element may cover above the light source plate, may receive the emergent light of the LED light source and may carry out optical configuration on the emergent light of the LED light source, and the driving module may be arranged in a periphery of the light incident portion of the optical element.

A lighting lamp is also disclosed in the present disclosure. The lighting lamp may include a lighting module. The lighting module may include a light source module, which may include a light source plate and a plurality of Light-Emitting Diode (LED) light sources; a driving module; and an optical element, where emergent light of the LED light source may be emitted after passing through the optical element, and the optical element may have a light incident portion and a light emergent portion; and where the driving module and the LED light source may be respectively adhered to the light source plate and may be integrated on the light source plate, the light incident portion of the optical element may cover above the light source plate, may receive the emergent light of the LED light source and may carry out optical configuration on the emergent light of the LED light source, and the driving module may be arranged in a periphery of the light incident portion of the optical element.

The lighting lamp may also include a shell for accommodating the lighting module and a face ring, wherein the lighting module is sandwiched between the shell and the face ring.

It is to be understood that, both the foregoing general description and the following detailed description are exemplary and explanatory only and are not restrictive of the present disclosure.

BRIEF DESCRIPTION OF THE DRAWINGS

The accompanying drawings herein are incorporated in and become parts of the specification, illustrate embodiments consistent with the present disclosure and, together with the description, serve to explain the principles of the present disclosure.

Figure 1:
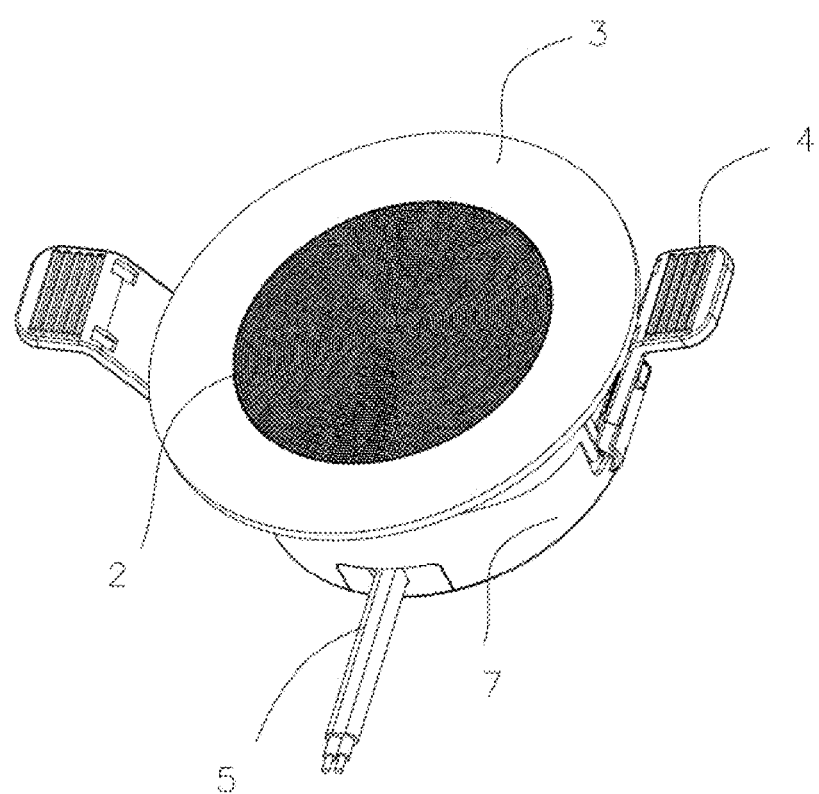
FIG. 1 is a stereoscopic combination diagram of a lighting lamp according to a preferred embodiment of the present disclosure.
Figure 2:
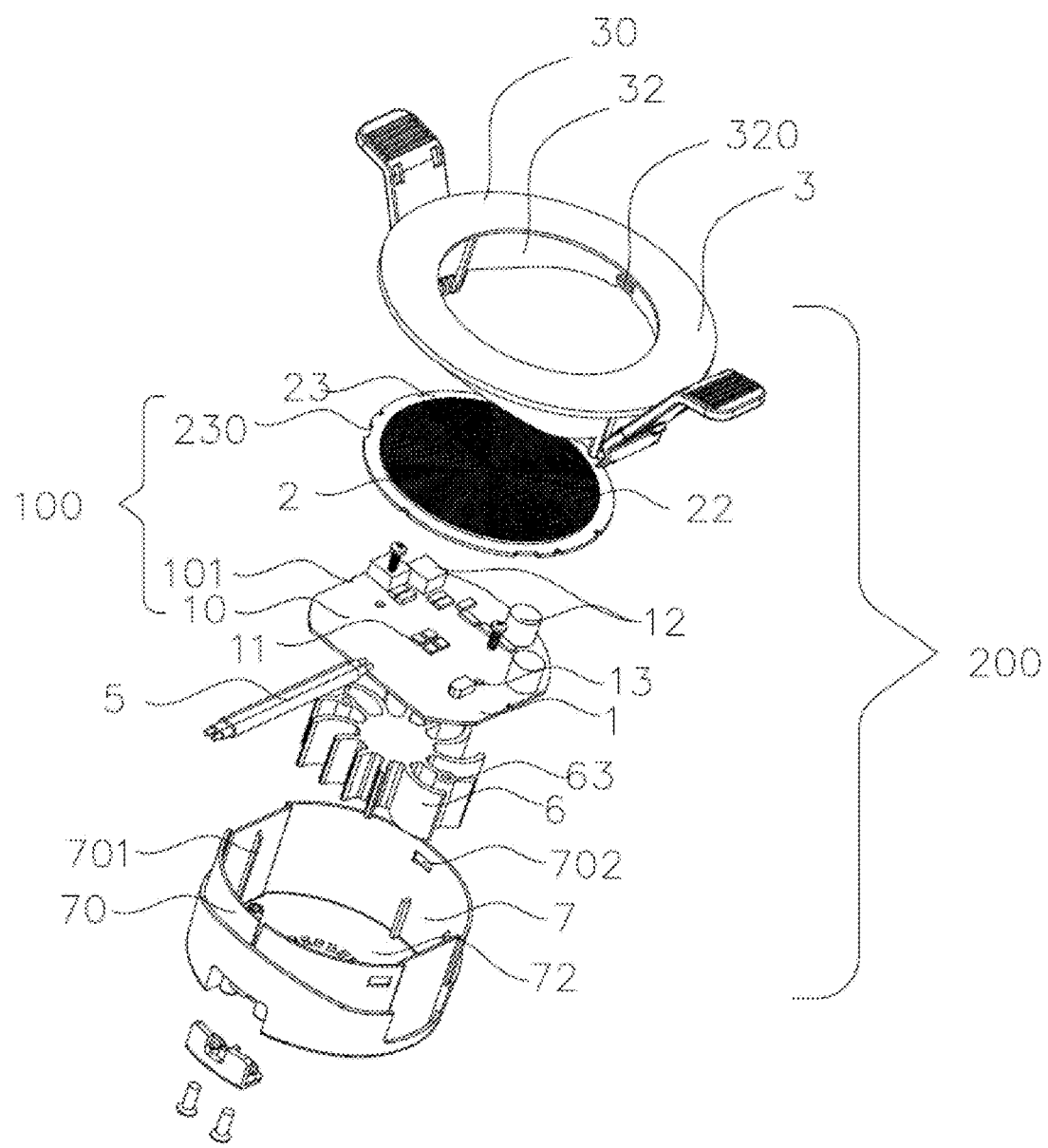
FIG. 2 is a stereoscopic exploded view of the lighting lamp illustrated in FIG. 1.
Figure 3:
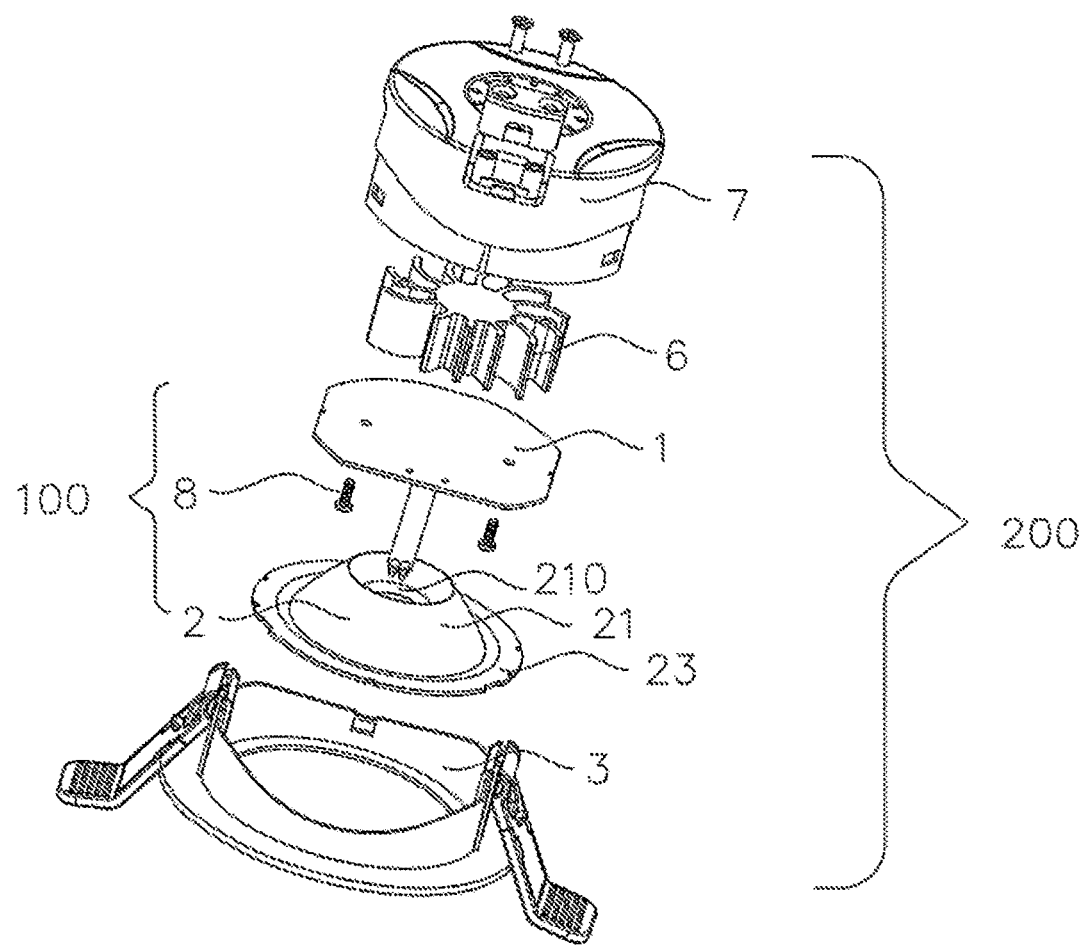
FIG. 3 is a stereoscopic exploded view of the lighting lamp illustrated in FIG. 2 from another angle.
Figure 4:
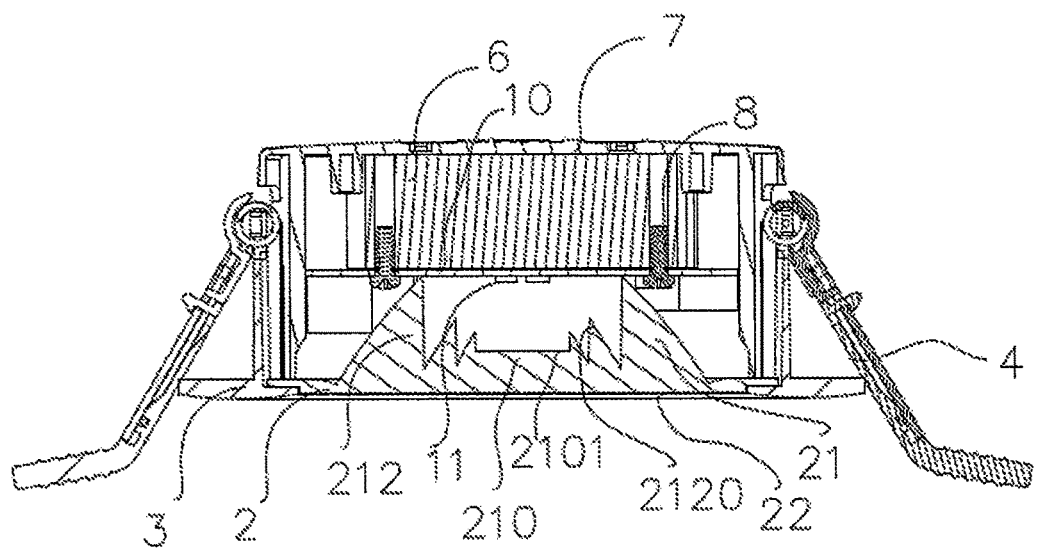
FIG. 4 is a sectional view of the lighting lamp illustrated in FIG. 1.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

The present disclosure is further described in detail in the following in connection with the drawings and preferred embodiments. The preferred embodiments below are used for illustrating the present disclosure, but not intended to limit the scope of the present disclosure.

In the description of the present disclosure, it should be noted that words such as "above", "below", "up-and-down direction", "left-and-right direction", "front-and-back direction" and the like denote a directional or positional relationship based on a directional or positional relationship illustrated in the drawings, is only used for facilitating describing the examples of the present disclosure and simplifying description, rather than denote or imply that the denoted apparatus or element have a specific direction and be constructed and operated in the specific direction, and thus, it should not be understood as limitation to the present disclosure. Unless otherwise specifically regulated and defined, words such as "installed", "connecting", "connected" and "assembled" should be generally understood, and for example, may be fixed connection, may also be detachable connection, or integrated formation, may be mechanical connection, may also be electrical connection, may be direct connection, may also be indirect connection by an intermediate medium, and may further be internal communication of two elements. Those skilled in the art can understand the specific meanings of the words in the present disclosure in connection of specific cases. Moreover, in the description of the present disclosure, unless otherwise defined, the phrase "a plurality of" indicates that there are two or more than two.

As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

"Green lighting" may mean that by scientific lighting design and adoption of a lighting electrical appliance product which is high in efficiency, long in service life, and safe and stable in performance, working, study and living conditions and quality of people are improved and enhanced; green lighting may be closely related to household life, and not only is green, environmental-friendly, economical and practical, but also importantly is energy-saving and efficient; and general use of green lighting greatly improve the home environment of people.

As a representative of green lighting, Light-Emitting Diode (LED) lighting is widely applied in various fields in recent years, where, ceiling lamps, e.g., an embedded light, a downlight, a spotlight and the like, are more and more widely applied due to a high light effect and a good decorative effect. Generally, the ceiling lamp includes elements, e.g., an LED light source module, a heat sink, a driver, a heat sink, a shell and the like, and all the elements are matched mutually to be assembled into one whole body. However, in this structure, the heat sink and the driver generally are relatively large in volume, and the heat sink also has a relatively large height, which undoubtedly increase a volume and a height of the ceiling lamp and do not accord with the development trend of current LED lighting. The applicant devotes to providing a lighting lamp which is small in volume and simple in structure and meanwhile, is good in light effect.

With reference to FIG. 1 to FIG. 4, a preferred embodiment of the prevent disclosure provides a lighting lamp 200 and a lighting module 100 accommodated in the lighting lamp. The lighting lamp 200 includes the lighting module 100, a heat sink 6 in contact with the lighting module 100, a shell 7 for accommodating the lighting module 100 and the heat sink 6 therein and a mask 3.

The lighting module 100 includes a light source module 1 and an optical element 2. The light source module 1 includes a plate-shaped light source plate 10, a plurality of LED light sources 11 and a driving module 12 respectively integrated on the light source plate 10. In the preferred embodiment of the present disclosure, the light source plate 10 is preferably a Printed Circuit Board (PCB) in which a circuit is arranged, and meanwhile, the circuit is in electrical connection with the LED light source 11 and the driving module 12. In the preferred embodiment of the present disclosure, the LED light source 11 and the driving module 12 are connected in a surface mount mode with the light source plate 10, and thus, cost is low, the structure is simple, and integration is high. In the preferred embodiment of the present disclosure, four LED light sources 11 are provided, are arranged densely and are adhered to the light source plate 10, so that a packaging process can be reduced and cost is reduced, but a number of the LED light sources 11 is not limited to the above, and preferably, the number of the LED light sources 11 is not less than two. The driving module 12 is integrated onto the light source plate 10, and is electrically connected with the circuit arranged in the light source plate 10; preferably, the driving module 12 is arranged on one side of the light source plate 10, a power supply wire 5 is arranged on the other side of the light source plate 10 and is also electrically connected, i.e., welded, with the light source plate 10 so as to form electrical connection with the driving module 12, and external power can reach the driving module 12 by the power supply wire 5 and drive the driving module 12 to supply power to the LED light source 11.

Figure 5:
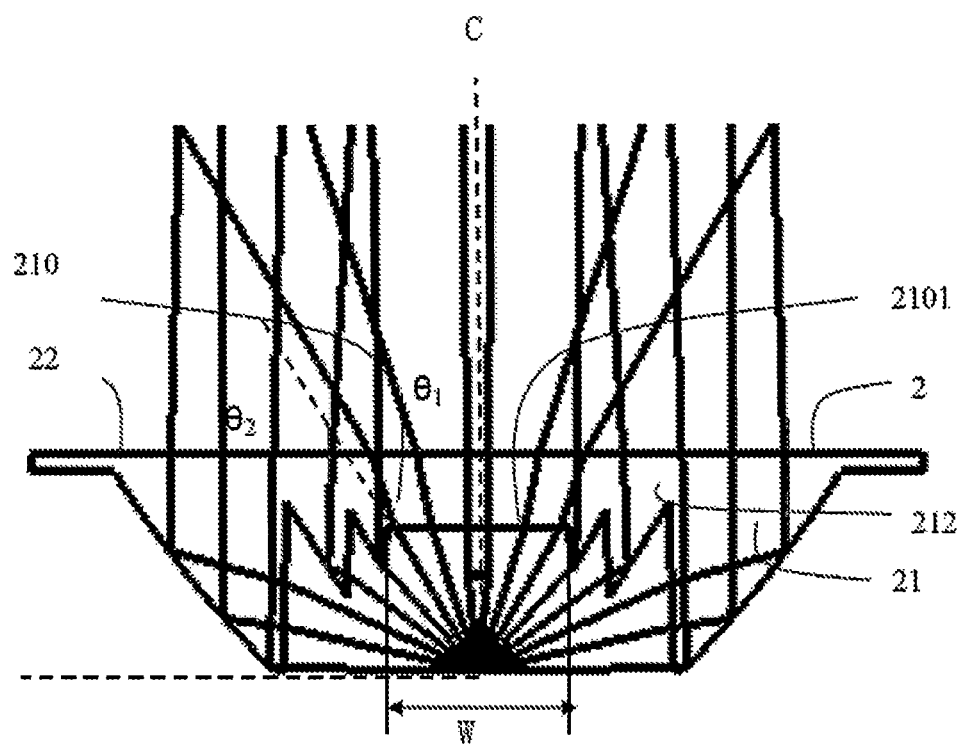
FIG. 5 is an optical path diagram of an optical element in the lighting lamp.
Figure 6:
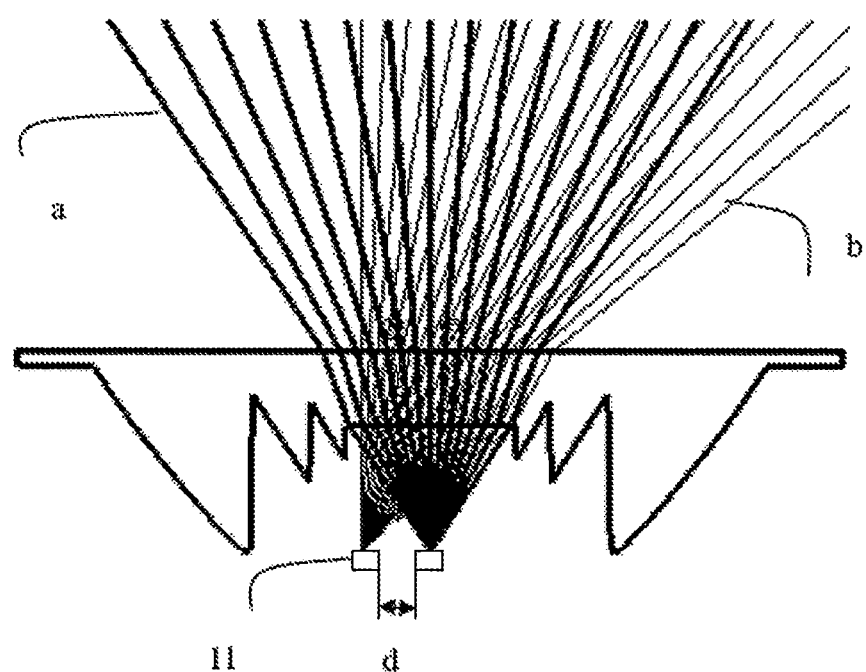
FIG. 6 is an optical path diagram of two LED light sources respectively passing through a central refraction region of the optical element.
Figure 7:
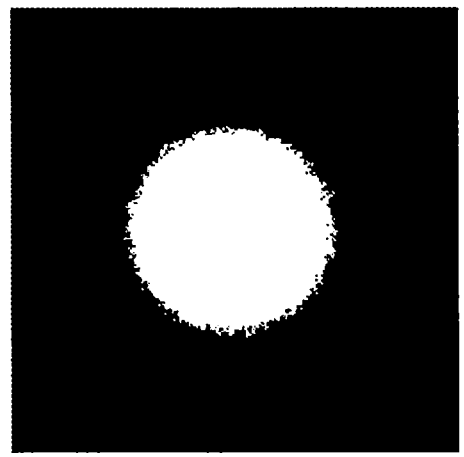
FIG. 7 is a schematic diagram of imaging of the lighting lamp of the present disclosure.
Figure 8:
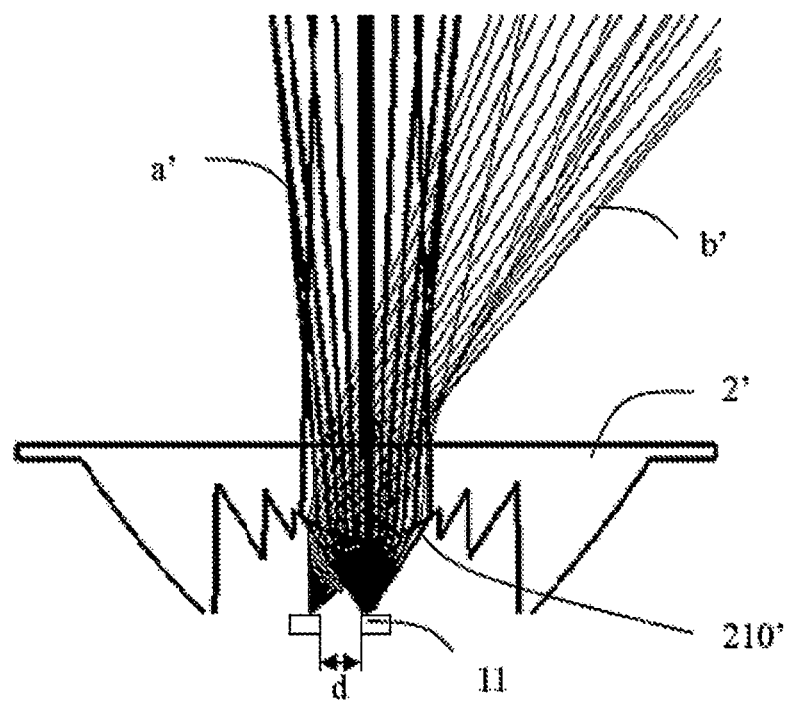
FIG. 8 is an optical path diagram of a lighting lamp adopting an optical element with an arc surface, two LED light sources respectively passing through a central refraction region of the optical element.
Figure 9:
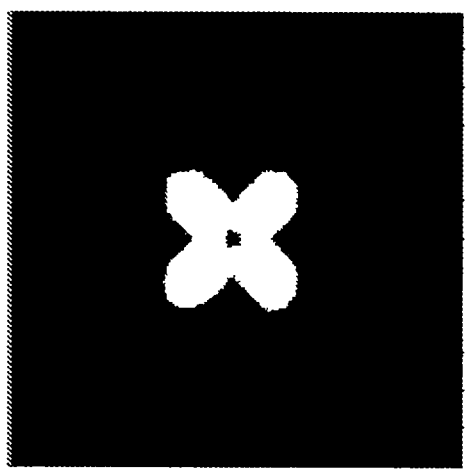
FIG. 9 is a schematic diagram of imaging of the lighting lamp illustrated in FIG. 8.

In connection with and with reference to FIG. 5 to FIG. 7, the optical element 2 is formed by an integrated lens or formed by combining a plurality of lens modules, is a hybrid lens, and has a light incident portion 21 and a light emergent portion 22 which are arranged along a height direction. One end (a free end of the light incident portion 21) of the optical element 2 is placed on the light source module 1, and the other end (a position where the light emergent portion 22 is positioned) abuts against an inner surface of a face ring 3, i.e., the optical element 2 is sandwiched between the light source module 1 and the face ring 3. The light incident portion 21 covers above the light source plate 10, receives emergent light of the LED light source 11 and carries out optical configuration on the emergent light of the LED light source 11, and the driving module 12 is arranged in a periphery of the light incident portion 21 of the optical element 2. The light incident portion 21 may be divided into three regions along a transverse direction (a direction perpendicular to the height direction): a central refraction region 210 positioned at a middle portion and directly facing a lower portion of the LED light source 11 and total internal reflection regions 212 symmetrically arranged on both sides of the refraction region 210, i.e., the total internal reflection regions 212 are arranged in a surrounding mode in a periphery of the refraction region 210. A bottom surface (a surface facing the LED light source 11) of the refraction region 210 is an incident plane 2101 extending along a horizontal direction (i.e., the transverse direction, which is perpendicular to the height direction), a width W of the bottom surface is preferably not smaller than a maximum light emitting diameter (unmarked) of the LED light source 11, but in other embodiments, the width W may also be smaller than the maximum light emitting diameter of the LED light source 11. In connection with and with reference to FIG. 5, emergent light of a single LED light source 11 is divided into two portions to respectively pass through the optical element 2, and after being incident at the incident plane 2101, one portion of emergent light (a portion with an included angle of θ1 with a center line C after the center line C passes through a center of the LED light source 11) is refracted by the refraction region 210 so as to directly emerge from the light emergent portion 22, and the portion of emergent light is uncollimated light. The total internal reflection region 212 is formed by tooth-shaped portions 2120 different in height, a number of the tooth-shaped portions 2120 is not smaller than 2 and is preferably three, and along a direction away from the central refraction region 210, heights of the tooth-shaped portions 2120 are gradually increased, i.e., the tooth-shaped portions 2120 are closer to the light source plate 10 along the height direction. Therefore, along the height direction, the refraction region 210 is the farthest away from the LED light source 11 so as to be the closest to a surface on which the light emergent portion 22 is positioned. However, the tooth-shaped portions 2120 of the total internal reflection region 212 are gradually close to the LED light source 11 along a direction away from the central refraction region 210, and are all closer to the LED light source 11 than the refraction region 210. With reference to FIG. 5, the other portion of light (a portion with an included angle of θ2 with a horizontal line) of the LED light source 11 is respectively incident from bottom surfaces of the total internal reflection regions 212 positioned on both sides of the refraction region 210 and is totally reflected in the total internal reflection regions and then emerges from the light emergent portion 22 after being refracted, and the portion of light becomes collimated light after passing through the total internal reflection regions 212. However, even though the LED light sources 11 are densely arranged, in order to enable the LED light sources 11 to be welded with solder joints on the light source plate 10 to form electrical connection and avoid generation of a short circuit phenomenon, a certain distance exists between two adjacent LED light sources 11. In the preferred embodiment of the present disclosure, the distance is defined as a minimum distance d, and generally, the minimum distance d is greater than or equal to 1.2 mm. With reference to FIG. 8 and FIG. 9, FIG. 8 and FIG. 9 illustrate an optical path and imaging of the LED light source 11 due to existence of the distance d after the applicant adopts an optical element 2' with a central refraction region 210' with an arc surface or a free curved surface in the research and development process. Emergent light of the LED light sources 11 generate an imaging phenomenon through the optical element 2', i.e., emergent light a' and b' of two adjacent LED light sources 11 are respectively collimated by the central refraction region 210' and then emerge from the light emergent portion after passing through the central refraction region 210' of the optical element 2'. However, it can be clearly seen from FIG. 8 and FIG. 9 that the emergent light a' and b' of two adjacent LED light sources 11, due to a certain distance d, is separated from each other after being collimated by the light emergent portion, and thus, an imaging phenomenon is generated, as illustrated in FIG. 9. Four LED light sources 11 form petal-shaped light spot imaging, which seriously influences performance of the lighting lamp. However, in connection with and with reference to FIG. 6 to FIG. 7, after emergent light a and b of the LED light sources 11 arranged at an interval is refracted by the central refraction region 210 with the horizontal incident plane 2101, which is adopted in the preferred embodiment of the present disclosure, the emergent light a and b of the separately disposed LED light sources 11 emerges as uncollimated light at the light emergent portion 22, and the two portions of emergent light a and b are overlapped with each other to the greatest extent, so that the imaging phenomenon is effectively eliminated, a complete light spot (as illustrated in FIG. 7) is formed, and a light effect of the lighting lamp is greatly promoted. Moreover, in order to implement emergent uniformity, the light emergent portion 22 is provided with a microstructure (which is not illustrated). In other preferred embodiments, when the optical element 2 is formed by combining a plurality of lens modules, the central refraction region 210 and the total internal reflection regions 212 may respectively formed of separate lenses, and then surround each other to form the optical element 2 of the present disclosure.

With further reference to FIG. 1 to FIG. 4, the mask 3 has a face ring 30 and a side wall 32 formed by extending from an upper surface of the face ring 30, and is provided with a wedge-shaped bump 320 used as a buckling portion. The light emergent portion 22 of the optical element 2 protrudes into a space formed by the face ring 30, and an edge portion 23 in the periphery of the optical element 2 abuts against a lower surface of the face ring 30 and is positioned on an inner side of the side wall 32.

The light source plate 10 and the heat sink 6 are respectively provided with screw holes 13 and 63 aligned along an assembling direction, and a pair of screws 8 respectively pass through the screw holes 13 and 63 to combine the light source plate 10 with the heat sink 6. In other preferred embodiments, the light source plate 10 and the heat sink 6 may also adopt other combination modes, e.g., adhesion and the like.

The shell 7 is a hollow cylinder, and has a ring-shaped side wall 70 and a top wall 72 adjacent to the side wall 70. Corresponding to the buckling portion 320 formed on the mask, an inner surface of the side wall 70 of the shell 7 is provided with an opening 702 used as a locking portion for being buckled and combined with the buckling portion 320. In other preferred embodiments, the bump and the opening may be interchanged, and combination of the shell 7 and the face ring 3 may also be implemented. Therefore, the optical element 2, the light source module 1 and the heat sink 6 are clamped between the shell 7 and the face ring 3 which are combined mutually, and are simultaneously accommodated in the shell 7. In order to implement accurate positioning and assembling on the optical element 2 and the light source module 1, the edge portion 23 of the optical element 2 is provided with at least one pair of positioning notches 230, the outer periphery of the light source plate 10 of the light source module 1 is also correspondingly provided with at least one pair of positioning notches 101, and strip positioning portions 701 are correspondingly formed on the inner surface of the side wall 70 of the shell 7 and respectively pass through the positioning notches 101 and 230 of the light source plate 10 and the optical element 2 so as to implement accurate positioning and installation.

When the lighting lamp of the present disclosure is a ceiling lamp, a downlight or a spotlight, the mask 3 is further pivoted with a pair of clamp spring components 4 for being assembled to an installation base, e.g., a ceiling or a hung ceiling and the like.

An objection of the present disclosure aims to provide a lighting module and a lighting lamp. In order to achieve the above object, the present disclosure adopts the following technical solution: a lighting module, comprising: a light source module, a driving module, and an optical element. The light source module includes a light source plate and a plurality of Light-Emitting Diode (LED) light sources. Emergent light of the LED light source is emitted after passing through the optical element, and the optical element has a light incident portion and a light emergent portion. The driving module and the LED light source are respectively adhered to the light source plate and are integrated on the light source plate, the light incident portion of the optical element covers above the light source plate, receives the emergent light of the LED light source and carries out optical configuration on the emergent light of the LED light source, and the driving module is arranged in a periphery of the light incident portion of the optical element.

Preferably, the LED light source is positioned at a middle portion of the light source plate, and the driving module is positioned at one end of the light source plate.

Preferably, the optical element is a hybrid lens, and the light incident portion of the optical element includes a central refraction region directly facing the LED light source and a total internal reflection region positioned on both sides of the refraction region, wherein the emergent light of the LED light source is refracted in the refraction region and then emitted from the light emergent portion, and the emergent light of the LED light source is totally reflected and then emitted after being refracted in the total internal reflection region.

Preferably, a microstructure is arranged on a surface of the light emergent portion. Preferably, a width of the refraction region is not smaller than a maximum light emitting diameter of the LED light source.

Preferably, an incident surface of the refraction region, which faces the LED light source, is a horizontal plane.

Preferably, at least two LED light sources are provided, and a minimum distance is set between two LED light sources.

In order to achieve the above object, the present disclosure further adopts the following technical solution: a lighting lamp, comprising the lighting module as mentioned above, a shell for accommodating the lighting module and a face ring, wherein the lighting module is sandwiched between the shell and the face ring.

Preferably, the lighting lamp is further provided with a heat sink in contact with the light source plate of the lighting module, the heat sink being accommodated in the shell and combined with the light source plate.

Preferably, the face ring and the shell are buckled.

Preferably, the optical element has an edge portion formed by extending from the periphery of the light emergent portion, both the edge portion and the light source plate are provided with positioning notches, an inner surface of the shell is provided with a positioning portion capable of being matched with the positioning notches for guiding the optical element and the light source plate to be assembled in the shell.

Compared to other implementations, the lighting module and the lighting lamp which are provided by the present disclosure are small in volume and simple in structure, and have an excellent optical effect.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

It should be noted that the embodiments of the present disclosure have preferred implementation and are not intended to limit the present disclosure in any form, those skilled in the art may change or modify the embodiments of the present disclosure into equivalent effective embodiments by utilizing the disclosed technical contents above, and any changes or equivalent variations and modifications made to the embodiments above according to the technical essence of the present disclosure, without departing from the contents of the technical solutions of the present disclosure, shall fall within the scope of the technical solutions of the present disclosure.

The invention claimed is:

1. A lighting module, comprising:
   a light source module, which includes a light source plate and a plurality of Light-Emitting Diode (LED) light sources;
   a driving module; and
   an optical element, wherein emergent light of the LED light source is emitted after passing through the optical element, and the optical element has a light incident portion and a light emergent portion;
   wherein the driving module and the LED light source are respectively adhered to the light source plate and are integrated on the light source plate, the light incident portion of the optical element covers above the light source plate, receives the emergent light of the LED light source and carries out optical configuration on the emergent light of the LED light source, and the driving module is arranged in a periphery of the light incident portion of the optical element;

wherein the optical element is a hybrid lens, and the light incident portion of the optical element includes a refraction region directly facing the LED light source and a total internal reflection region positioned on both sides of the refraction region and having at least two different heights relative to the refraction region, wherein the emergent light of the LED light source is refracted in the refraction region and then emitted from the light emergent portion, and the emergent light of the LED light source is totally reflected and then emitted after being refracted in the total internal reflection region, and the emergent light from different LED sources are overlapped after being refracted, wherein one LED source is situated substantially in a middle position of the optical element and another LED source is away from the one LED source and is situated in a distance from the one LED source; and wherein an incident surface of the refraction region, which faces the LED light source, is a horizontal plane.

2. The lighting module according to claim 1, wherein the LED light source is positioned at a middle portion of the light source plate, and the driving module is positioned at one end of the light source plate.

3. The lighting module according to claim 1, wherein a microstructure is arranged on a surface of the light emergent portion.

4. The lighting module according to claim 1, wherein a width of the refraction region is not smaller than a maximum light emitting diameter of the LED light source.

5. The lighting module according to claim 1, wherein the different LED sources comprise at least two LED light sources, and a minimum distance is set between two LED light sources.

6. The lighting module according to claim 1, wherein the at least two different heights relative to the refraction region define a tooth-shaped portion.

7. A lighting lamp, comprising:
a lighting module, comprising:
a light source module, which includes a light source plate and a plurality of Light-Emitting Diode (LED) light sources;
a driving module; and
an optical element, wherein emergent light of the LED light source is emitted after passing through the optical element, and the optical element has a light incident portion and a light emergent portion;
wherein the driving module and the LED light source are respectively adhered to the light source plate and are integrated on the light source plate, the light incident portion of the optical element covers above the light source plate, receives the emergent light of the LED light source and carries out optical configuration on the emergent light of the LED light source, and the driving module is arranged in a periphery of the light incident portion of the optical element; and
a shell for accommodating the lighting module and a face ring, wherein the lighting module is sandwiched between the shell and the face ring; and
wherein the optical element is a hybrid lens, and the light incident portion of the optical element includes a refraction region directly facing the LED light source and a total internal reflection region positioned on both sides of the refraction region and having at least two different heights relative to the refraction region, wherein the emergent light of the LED light source is refracted in the refraction region and then emitted from the light emergent portion, and the emergent light of the LED light source is totally reflected and then emitted after being refracted in the total internal reflection region, and the emergent light from different LED sources are overlapped after being refracted, wherein one LED source is situated substantially in a middle position of the optical element and another LED source is away from the one LED source and is situated in a distance from the one LED source; and
wherein an incident surface of the refraction region, which faces the LED light source, is a horizontal plane.

8. The lighting lamp according to claim 7, wherein the lighting lamp is further provided with a heat sink in contact with the light source plate of the lighting module, the heat sink being accommodated in the shell and combined with the light source plate.

9. The lighting lamp according to claim 7, wherein the at least two different heights relative to the refraction region define a tooth-shaped portion.

10. The lighting lamp according to claim 7, wherein the face ring and the shell are buckled.

11. The lighting lamp according to claim 10, wherein the optical element has an edge portion formed by extending from the periphery of the light emergent portion, both the edge portion and the light source plate are provided with positioning notches, an inner surface of the shell is provided with a positioning portion capable of being matched with the positioning notches for guiding the optical element and the light source plate to be assembled in the shell.

* * * * *